United States Patent Office

3,834,899
Patented Sept. 10, 1974

3,834,899
METHOD OF MANUFACTURING LOW-CARBON FERROCHROMIUM
Isao Tanabe, Tokyo, Japan, assignor to Japan Metals and Chemicals Co., Ltd., Tokyo, Japan
No Drawing. Continuation-in-part of abandoned application Ser. No. 98,888, Dec. 16, 1970. This application Apr. 6, 1972, Ser. No. 241,827
Claims priority, application Japan, Feb. 9, 1970, 45/11,360
Int. Cl. C22c 33/00
U.S. Cl. 75—130.5                                   2 Claims

ABSTRACT OF THE DISCLOSURE

A method of manufacturing low-carbon ferrochromium is disclosed.

(a) A mixture of chrome ore and lime is heated to a temperature of about between 900–1250° C. until a burnt material having a $CO_2$-content of less than 0.1% by weight is obtained.

(b) 30–60 parts by weight of the burnt material of (a) are then subjected to smelting in an electric furnace to obtain a slag.

(c) The remaining 70–40 parts of the burnt material of (a) are then admixed with the theoretically calculated amount of silicochromium having a Si content of about between 38–54% by weight. At least 80% by weight of the silicochromium is admixed with the remaining 70–40 parts of the burnt material of (a) in molten state while the remainder of the silicochromium is admixed in unheated state.

(d) The mixture of (c) is then reacted with the smelted slag of (b).

CROSS REFERENCE TO PRIOR APPLICATIONS

This is a continuation-in-part of copending application Ser. No. 98,888, filed Dec. 16, 1970, now abandoned.

FIELD OF INVENTION

The invention is directed to an improved method for the manufacture of low-carbon ferrochromium containing less than 0.1% of carbon. The inventive procedure is primarily predicated on the reduction of silicochromium with molten slag composed of chrome ore and burnt lime. Low-carbon ferrochromium obtained in accordance with the inventive procedure constitutes an important material and may for example be used as additive or alloying component in the production of chrome-containing alloy steel, such as stainless steel.

BACKGROUND INFORMATION AND PRIOR ART

A variety of procedures have previously been proposed for the purpose of manufacturing low-carbon ferrochromium. According to one of the prior art proposals the low-carbon ferrochromium is produced pursuant to the so-called Swedish Process. According to the Swedish Process chrome ore and lime are semi-molten in an electric furnace whereupon crushed silicochromium is added and heated. According to an alternative procedure the mixture referred to is charged into an electric furnace and partly smelted.

According to a different proposal, usually referred to as the Perrin Method, as disclosed in Japanese Patent No. 156,346, desiliconization of molten silicochromium is achieved by the presence of molten slag having a high chromium content. The molten slag of high chromium content is obtained from the next stage. In this manner silicochromium of a low silicon content (intermediate metal) is produced and the intermediate metal is then reacted with synthetic chromium slag. The synthetic chromium slag is usually made by melting the chrome ore and lime. In this manner low-carbon ferrochromium and the slag of high chromium content referred to are manufactured.

However, the Swedish Process, as referred to, has serious disadvantages and drawbacks in that the chromium recovery is unsatisfactory. Instead slag of high chromium content is obtained. Moreover, the carbon content in the ultimate product is high because of recarburization emanating from the electrodes, the chrome ore and the lime. Further the electric power consumption is considerable because cold silicochromium is used.

Also the Perrin Method as referred to above has considerable drawbacks in that the electric power consumption is very large. This is so because the entire amount of ore and lime has to be melted. Further, the Perrin Method is complicated because intermediate metal is first produced. Carburization, however, is avoided in the Perrin Method because synthetic chromium slag is used.

SUMMARY OF INVENTION

It is a primary object of the present invention to overcome the disadvantages and drawbacks of the prior art procedures and to provide a method for the production of low-carbon ferrochromium which is exceedingly simple to carry out, which requires a minimum of power and according to which superior chromium recovery is had.

Generally it is an object of the invention to improve on the art of producing ferrochromium as presently practiced.

Briefly and in accordance with this invention, low-carbon ferrochromium containing less than 0.1% of carbon is produced as follows.

(a) First a mixture of chrome ore and lime is heated to a temperature of about between 900–1250° C., until a burnt material having a $CO_2$ content of less than 0.1% by weight is obtained.

(b) 30–60 parts by weight of the burnt material of (a) is then smelted in an electric furnace to obtain a slag.

(c) The remaining 70–40 parts by weight of the burnt material of (a) are admixed with the theoretically calculated amount of silicochromium having a Si content of about between 38–54% by weight. At least 80% of the silicochromium should be admixed with the remaining 70–40 parts of the burnt material of (a) in molten state, while the remainder of the silicochromium should be admixed in unheated state.

(d) The mixture of (c) above is then reacted with the smelted slag of (b).

The heating of the chrome ore and lime mixture according to step (a) is advantageously carried out in a rotary kiln. The heating of the chrome ore and lime mixture is continued until the $CO_2$ content of the mixture is less than 0.1%.

The inventive procedure has several important advantages. Contrary to the Perrin Method, no intermediate metal is produced in the course of the desiliconization. The inventive procedure therefore requires much less time than the Perrin Method. Further the operation is significantly simplified and loss of chromium is reduced to a minimum. The electric power consumption is extremely small. This is so because the chrome ore and the lime are preheated and only about one half of the mixture is actually melted. Further the necessary amount of lime is considerably less than that required in the Perrin Method. In the desiliconization, the sensible heat for preheating the raw materials, the sensible heat of silicochromium and the heat for smelting the raw materials through reduction by silicon are well balanced. This effectively prevents excessive temperature rise of the molten bath after completion of the reaction and abrasion of the linings for the ladle is minimized. Further no vapor loss of chromium takes place. Since the $CO_2$ which is contained in the mixture of step (a) is sufficiently heated so as to cause decomposition, the carbon content in the final product is significantly reduced.

The reasons for the various conditions described above are now discussed in detail.

It is important for heating the chrome ore and the lime to a temperature range of about between 900–1250° C., as effected in step (a). This is so because this heating, of course, drastically reduces the electric power consumption required for the subsequent smelting of a portion of the product of step (a) in the electric furnace. Thus the heat required for the preheating in step (a) is therefore effectively utilized. Moreover, due to the use of this high temperature in step (a), the carbonate which is contained in the mixed raw material, to wit, the chrome ore and the lime in step (a) and the water bound to the lime are sufficiently decomposed and thus eliminated. From a practical point of view it has been ascertained that with a view to reducing the $CO_2$ percentage to below 0.1%, heating to at least 900° C. is required. The actual temperature within the indicated range of 900–1250° C. will be chosen in dependence on the particle size and nature of the raw material of step (a). However, it has been ascertained that for raw materials of the customary size, temperatures of 900° C. or slightly above yield satisfactory results. Chrome ore customarily is in the form of fine ore having a particle size of less than 5 mm. while lime usually is used in broken-up or crushed form with particles of less than 40 mm.

Turning now to the condition of step (a) that the heating should be effected until the $CO_2$ content of the mixture is less than 0.1% by weight, it should be stressed that such a low $CO_2$ content prevents carbon pick-up in the product. The following Table 1 is directed to the heating of a mixed raw material, wherein the chrome ore originally contained 1.5% of $CO_2$ while the lime had a $CO_2$ content of 2% and bonded water of 1.5%. The chrome ore and the lime were mixed at a ratio of 50:40 by weight. It will be noted that if the mixed raw material was heated at 800° C., to wit, below the indicated range, the $CO_2$ content in the product obtained was still 0.4% while the carbon in the product amounted to 0.05%. The carbon content as listed in Table 1 refers to a final ferrochromium product manufactured from 45% of melt and 55% of residual burnt charge, silicochromium having been added.

As is clear from Table 1, the $CO_2$ content drops rapidly from the original 1.7% to 0.1%, the drop being very much dependent on the temperature of the heating. Thus the 0.1% value required a temperature of 900° C. which also reduced the amount of carbon in the final product. It is believed that the above phenomenon is due to the fact that residual $CaCO_3$ is completely decomposed at the indicated temperature and that no recarburization takes place.

If the chromium ore-lime mixture is heated above 1250° C., to wit, beyond the upper temperature limit stipulated above, the mixture will sinter in the rotary kiln which, of course, is undesired since it makes the further steps more difficult to carry out. Moreover, the use of higher temperatures is uneconomical because it would necessitate the employment of a refractory lining in the kiln which is made of a highly heat resistant material. Further, the consumption of fuel, such as heavy oil, for heating the mixture would be greatly and unnecessarily increased. For this reason the indicated range of about between 900–1250° C. has proven to be the most advantageous.

Turning now to the requirement of step (b) according to which about 30–60 parts of the burnt material obtained according to step (a) are smelted in an electric furnace, it is noted that the reason for limiting the quantity of the burnt material to be charged into the electric furnace is based on considerations of thermal balance and on considerations involving the subsequent step (c). By smelting 30–60 parts by weight, as indicated, several troublesome phenomena are eliminated. Thus for example, by not using the entire amount of the burnt material of step (a), the temperature of the molten bath is not reduced after the reaction to an excessive extent which otherwise would cause sticking of metal to the ladle walls. Further, it reduces the danger of excessive temperature increase which in turn could seriously damage the ladle lining.

Table 2 reports on test results wherein low-carbon ferrochromium was manufactured as follows: A melt was produced from chrome ore and lime which are smelted at the ratio of 50:40 by weight and having a $CO_2$ content of 1.7%. The burnt charge was heated at a temperature of 1100° C., the burnt charge having the same weight ratio of chrome ore and lime as the melt. A molten bath of silicochromium (Cr 36.5%, Si 44%) and a cold charge of silicochromium were added at various ratios.

TABLE 2

| | Chromium and lime burnt by 1,100° C. | | Silicochromium | | Temperature of molten bath after reaction (° C.) | Extent of stickness on ladle after taking out of bath | Number of endurance for reaction ladle |
|---|---|---|---|---|---|---|---|
| | Melt: (approximately 1,600 °C.) | Charge in ladle: (approximately 900° C.) | Molten: (approximately 1,600 °C.) | Cold charge (20° C.) | | | |
| 1 | 20 | 80 | 98 | 2 | 1,780 | Large | |
| 2 | 30 | 70 | 100 | 0 | 1,815 | Little | 48 |
| 3 | 40 | 60 | 98 | 2 | 1,842 | None | |
| 4 | 50 | 50 | 98 | 2 | 1,873 | ___do___ | |
| 5 | 60 | 40 | 99 | 1 | 1,902 | ___do___ | 37 |
| 6 | 70 | 30 | 97 | 3 | 1,930 | ___do___ | 18 |
| 7 | 80 | 20 | 98 | 2 | 1,965 | ___do___ | |
| 8 | 50 | 50 | 90 | 10 | 1,850 | ___do___ | |
| 9 | 50 | 50 | 81 | 19 | 1,822 | Little | |
| 10 | 50 | 50 | 69 | 31 | 1,795 | Large | |
| 11 | 60 | 40 | 91 | 9 | 1,872 | None | |
| 12 | 70 | 30 | 82 | 18 | 1,875 | ___do___ | |

TABLE 1

| Temperature for heating raw material, ° C. | Percentage of $CO_2$ content, percent | Carbon in product, percent |
|---|---|---|
| 800 | 0.4 | 0.05 |
| 850 | 0.3 | 0.55 |
| 900 | 0.1 | 0.03 |
| 1,000 | 0.05 | 0.03 |

As is clearly apparent from the test results of Table 2, if the melt constitutes less than 30 parts, the temperature of the molten bath after the reaction is so low that the metal has a tendency to stick to the reaction ladle. By contrast, if the amount of melt is more than 60 parts, the temperature of the molten bath after the reaction is too high, which in turn causes heavy erosion of the lining of the reaction ladle. Accordingly, the indicated 30–60 parts by weight represent the advantageous range.

Concerning the silicochromium, it would be desirable to use the entire amount in hot state thereby reducing the electric power consumption for the refining procedure. On the other hand, it facilitates the operation if the reaction takes place in a molten bath of silicochromium which originally contains less than the required amount of silicochromium and that a final adjustment is thereafter made, by adding the missing amount of silicochromium in unheated form. However, if the amount of unheated silicochromium is too high, and experience has indicated that the cold charge should not exceed about 20% of the theoretically desired amount, the temperature of the molten bath is reduced too much. This in turn requires reduction in the amount of the burnt raw material which is charged into the reaction ladle. This is undesired and accordingly not more than 20% of the silicochromium should be used in cold state.

It is important that the Si content of the silicochromium should be within the indicated range of 38–54%. This reduces the carbon content of the final product in the desired manner. Silicochromium, having a silicon content of the indicated value, is available on the market or, of course, it may be specially produced. It may thus be produced in a silicochromium furnace. The use of the indicated material releases a considerable amount of energy in the form of heat owing to the reducing action of silicon, so that it is required to maintain the balance of heat. This is realized in one of the steps of the inventive procedure. The silicochromium containing 38–45% of silicon generally contains chromium in a range of from 27–40% by weight.

Combined with the aforementioned step of maintaining the balance of heat, the production of silicochromium containing 38–54% of silicon makes it possible economically to produce ferrochromium of extremely low carbon contents, to wit, less than 0.1% of carbon.

The present procedure also includes procedures for promoting the chromium yield by known reladling.

The invention will now be described by an example, it being understood, however, that this example is given by way of illustration and not by way of limitation and that many changes may be effected without affecting in any way the scope and spirit of the appended claims.

EXAMPLE

A mixed raw material, to wit, a mixture of 525 parts by weight of chrome ore and 475 parts by weight of lime, as shown in the following Table 3, is heated in a rotary kiln to a temperature of about 1100° C. The exact composition of the raw material is indicated in Table 3. In this manner a burnt material or slag, having a $CO_2$ content of 0.020–0.023% is obtained.

TABLE 3

| Name of materials | Average composition for materials (dry weight percent) | | | | |
|---|---|---|---|---|---|
| | Cr | Fe | CaO | $CO_2$ | $H_2O$ |
| Chrome ore | 34.5 | 14.8 | | 1.4 | |
| Lime | | | 96.0 | 2.0 | 1.5 |
| Mixed material (raw) | 19.6 | 8.4 | 41.7 | 1.7 | 0.6 |

This completes step (a) previously referred to. The burnt material or slag is received in a container having a brick lining for heat insulation purposes. One half of the material is charged to and smelted in a 5,000 kva. tilting arc furnace and is poured by 2 tons into a 7 ton reaction ladle moving a magnesia lining for measurement. Thereafter approximately 2 tons (temperature of between 850 and 900° C.) of the burnt materials which has not been charged to the electric furnace and approximately 808 kg. (95% of the required amount) of silicochromium in the form of a molten bath and having a temperature of approximately 1600° C. were introduced into the reaction ladle. The silicochromium contained 36.5% of chromium and 44% of Si and was produced in a silicochromium furnace. The addition of the silicochromium should be effected all at once or the charging of the burnt material and the silicochromium should be effected successively or in increments in order to avoid sudden temperature fluctuations of significant values. After the charging the molten bath is transferred to another ladle of the same volume capacity and is preheated by a heavy oil burner. The remainder of the silicochromium is added in unheated state, to wit, 5% of the total amount is thus added in cold condition. The addition of the remainder of the silicochromium should take into consideration the chromium content of the slag and the reladling to the original reaction ladle. After removing the slag by means of tilting, casting is effected into a mold to obtain the final product. The product, after cooling, is crushed and a final product of 1,350 kg. is obtained.

The composition of the final product was as follows: 66.5% of chromium, 0.5% of Si and 0.03% of C and average results of a manufacture during a twenty-day period are reported in the following Table 4. For comparison purposes, Table 4 also lists the results of products manufactured according to the Perrin Method and the Swedish Process.

TABLE 4

| | Results of manufacture | | |
|---|---|---|---|
| | Method of the present invention | Previous method | |
| Method for manufacture | | Swedish Process | Perrin Method |
| Cr yield (percent) | 87.8 | 84.0 | 88.7 |
| SiCr unit (kg./t) | 630 | 645 | 635 |
| Electric power unit (kwh./t) | 1,105 | 2,560 | 3,780 |
| C in product (percent) | 0.03 | 0.05 | 0.03 |

The superiority of the inventive procedure is evident from the Table, particularly in respect of less power consumption.

As will be understood from the above, the inventive procedure for the production of low-carbon ferrochromium principally relies on the reduction of a molten slag of chromium ore and quicklime with silicochromium. The heat of reaction produced by a silicochromium melt having a high silicon content, a chromium ore-lime melt and a chromium ore-lime sinter is properly balanced and a ferrochromium is produced which has an exceedingly low carbon content.

The U.S. Udy Patent 2,582,469 makes use of a raw material which is sintered at elevated temperature of about 1300–1450° C. This sintering procedure involves considerable technical difficulties because ring formation caused by the sintering must be prevented in the rotary kiln. According to Udy's method, a large quantity of heavy oil has to be used to elevate the temperature to the desired high level. This in turn requires that the refractory linings are made of a highly heat resistant material. The use of the extremely high temperature as proposed by Udy thus results in an uneconomical method.

Further, Udy proposes the use of silicochromium which is not in molten form. More specifically, the patent referred to discloses that a reducing agent, such as for example, silicon or chromium may be used in place of carbonaceous reducing agents for the purpose of carrying out the reduction in an electric furnace. If a chromium ore-lime melt and a silicochromium melt of high silicon content are caused to react with each other, the reaction would proceed extremely rapidly and out of control. This in turn would result in abnormally elevated temperatures and indeed would cause the explosion of the charge and the melting down of the refractory lining. Accordingly the materials in question or one of them is usually used in cold state, or a silicon alloy of low silicon content is employed for reaction purposes. This corresponds to the Perrin Method. Furthermore, ferrochromium produced in an electric furnace according to Udy has a high carbon content ranging from 1.5–7.0% as stated in column 4, lines 44–46 of the Udy patent. It would not be possible to produce low-carbon ferrochromium containing less than 0.1% of carbon according to the Udy method.

Another method which is relevant is that disclosed in U.S. Pat. 3,058,004, Rathmann. Rathmann uses silicochromium containing 4.5–6.0% of carbon. According to Rathmann, chromium ore and lime are directly smelted to form a melt. No consideration is given to the removal of carbon. Rathmann uses a ferrochromium of low silicon content, to wit, a silicon content in the range of from 10–18% is employed so that the balance of heat is maintained. Rathmann does not disclose or suggest the art of maintaining the balance of heat produced by the chromium ore-lime melt, the chromium ore-lime sinter and the silicochromium, so as to economically produce very low carbon ferrochromium while at the same time economizing on the heat consumption.

What is claimed is:

1. A method of manufacturing low-carbon ferrochromium containing less than 0.1% of carbon, which comprises:
   (a) heating a mixture of chrome ore and lime to a temperature between 900–1250° C. until a burnt material having a $CO_2$-content of less than 0.1% by weight is obtained, the particle sizes of the chrome ore and lime being less than 5 mm. and 40 mm. respectively;
   (b) smelting 30 to 60 percent by weight of the burnt material of (a) in an electric furnace to obtain a slag and then separating the slag;
   (c) admixing the slag and the remaining 70–40 percent by weight of the burnt material of (a) with the theoretically calculated amount of silicochromium having a Si content of between about 38–54% by weight wherein at least 80% by weight of said silicochromium is admixed with said remaining 70–40 percent by weight in a molten state while the remainder of said silicochromium is admixed in an unheated state, and then removing the slag from the mixture.

2. A method as claimed in claim 1, wherein step (c) includes a reladling procedure, wherein the molten bath is reciprocally moved between an original reaction ladle and a second ladle for promoting the yield of chromium.

References Cited

UNITED STATES PATENTS

| 2,582,469 | 1/1952 | Udy | 75—130.5 |
| 3,085,004 | 4/1963 | Rathman et al. | 75—130.5 |
| 1,543,321 | 6/1925 | Danieli et al. | 75—133.5 |
| 3,301,669 | 6/1967 | Rathman et al. | 75—130.5 |
| 2,375,291 | 5/1945 | Doom | 75—130.5 |

FOREIGN PATENTS

| 589,125 | 6/1947 | Great Britain | 75—130.5 |
| 1,020,769 | 2/1966 | Great Britain | 75—130.5 |
| 1,343,235 | 10/1963 | France | 75—130.5 |

WALTER R. SATTERFIELD, Primary Examiner

U.S. Cl. X.R.

75—126, 133.5